May 13, 1952  E. F. HILL  2,596,400
SEALED EDGE SLITTING MACHINE
Filed April 2, 1949  12 Sheets-Sheet 1

INVENTOR.
EDWARD F. HILL
BY
ATTORNEY

May 13, 1952   E. F. HILL   2,596,400
SEALED EDGE SLITTING MACHINE
Filed April 2, 1949   12 Sheets-Sheet 2

INVENTOR.
EDWARD F. HILL
BY
ATTORNEY

May 13, 1952 E. F. HILL 2,596,400
SEALED EDGE SLITTING MACHINE
Filed April 2, 1949 12 Sheets-Sheet 3

INVENTOR.
EDWARD F. HILL
BY [signature]
ATTORNEY

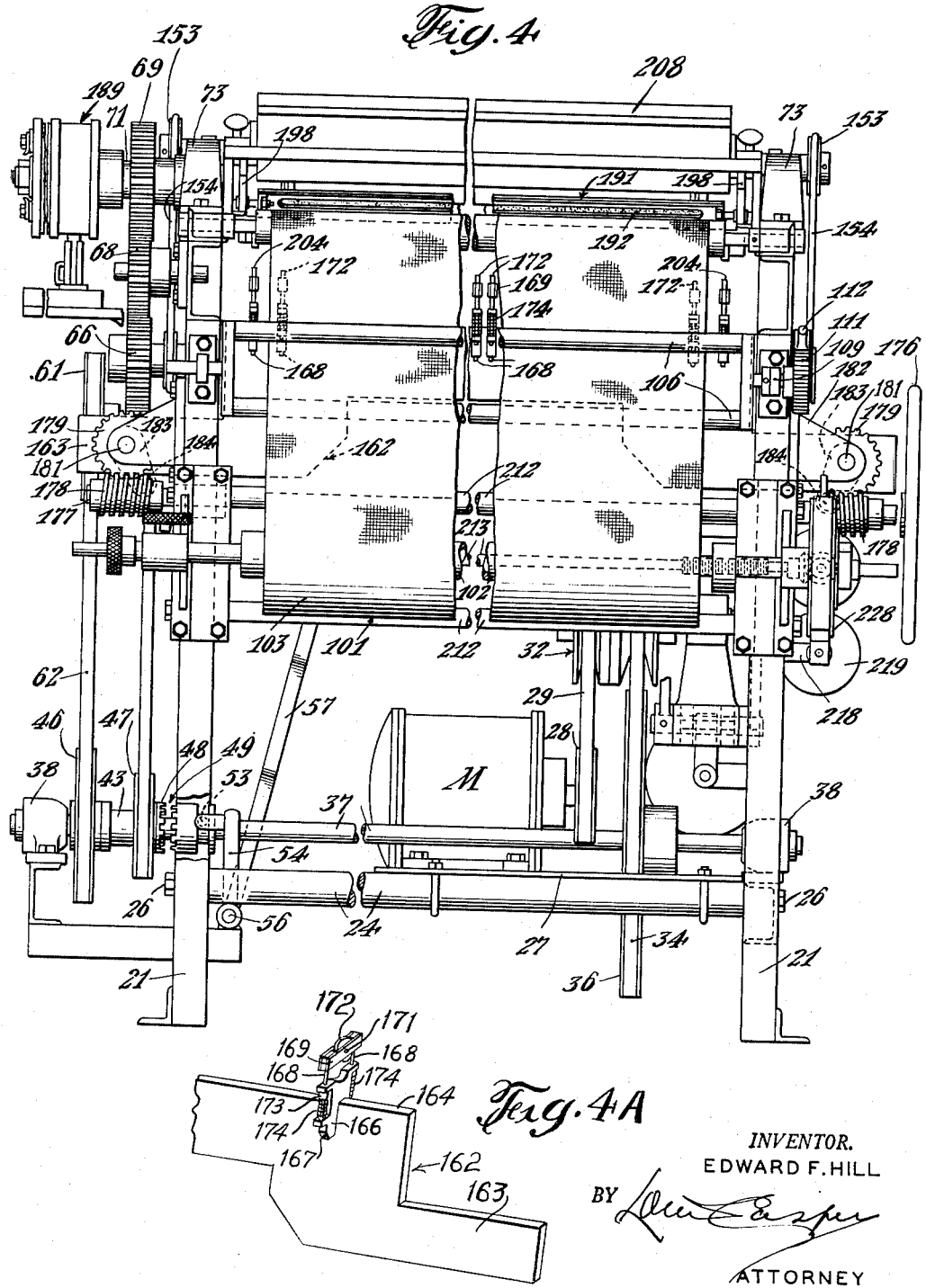

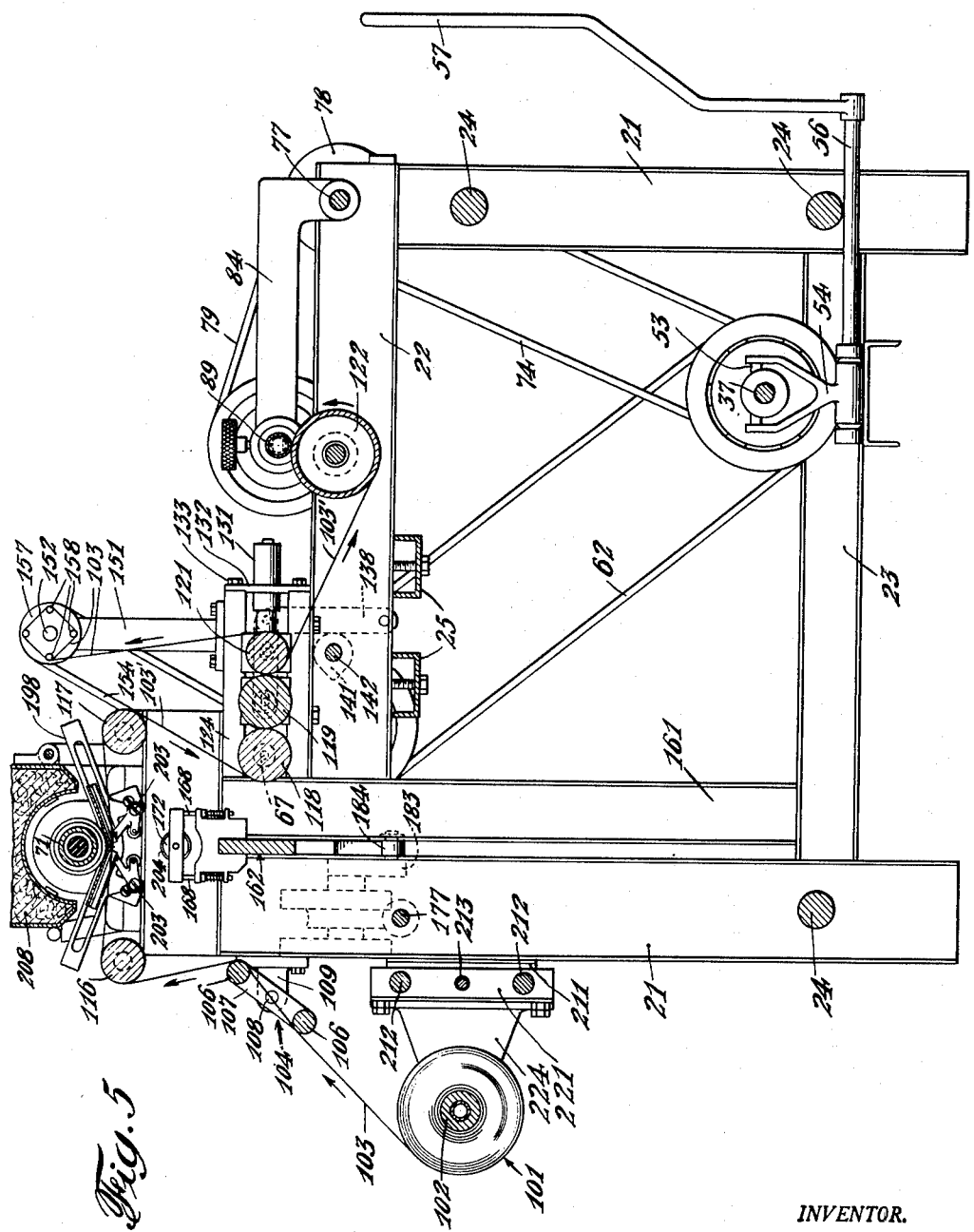

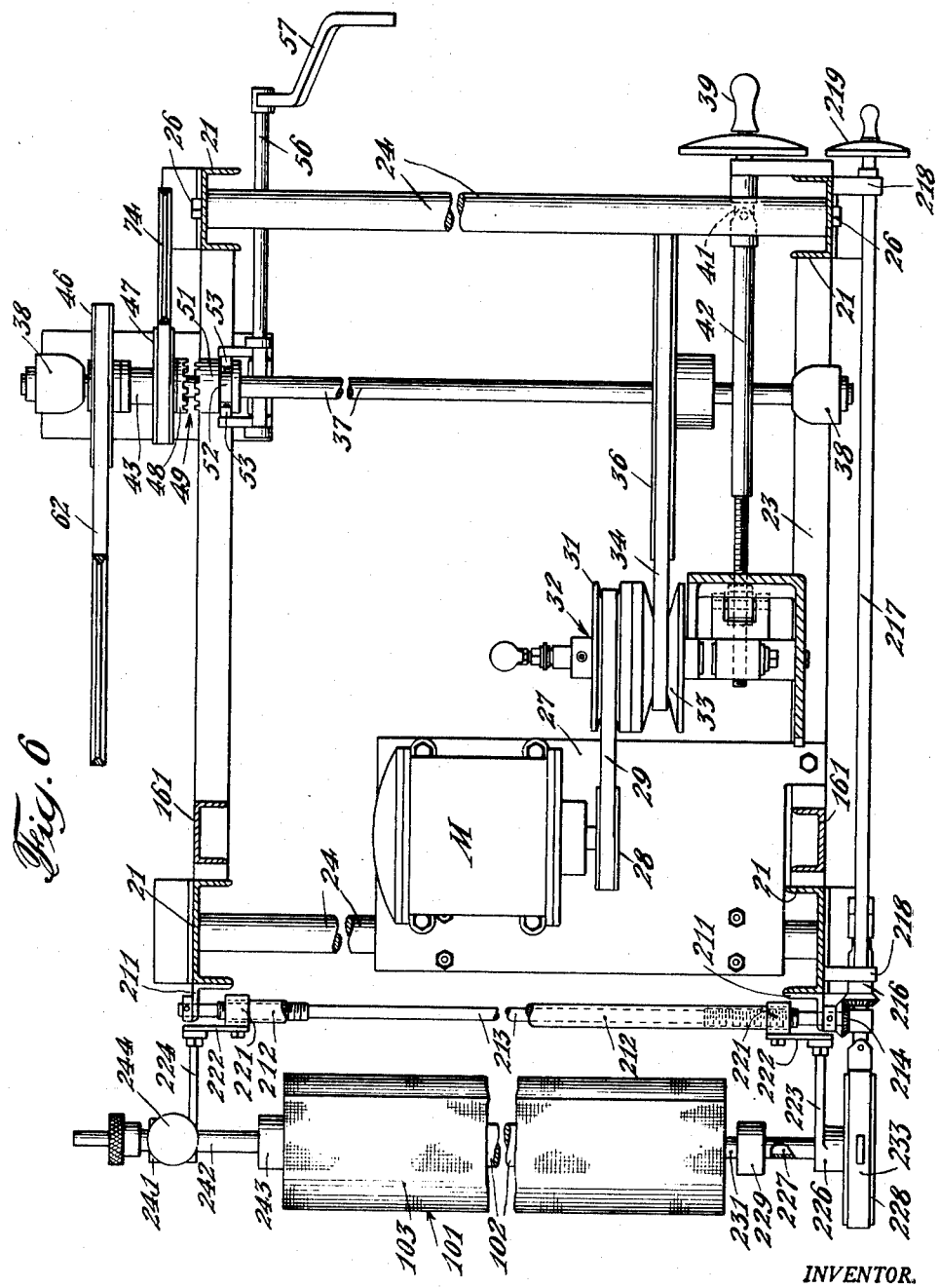

May 13, 1952  E. F. HILL  2,596,400
SEALED EDGE SLITTING MACHINE
Filed April 2, 1949  12 Sheets-Sheet 7
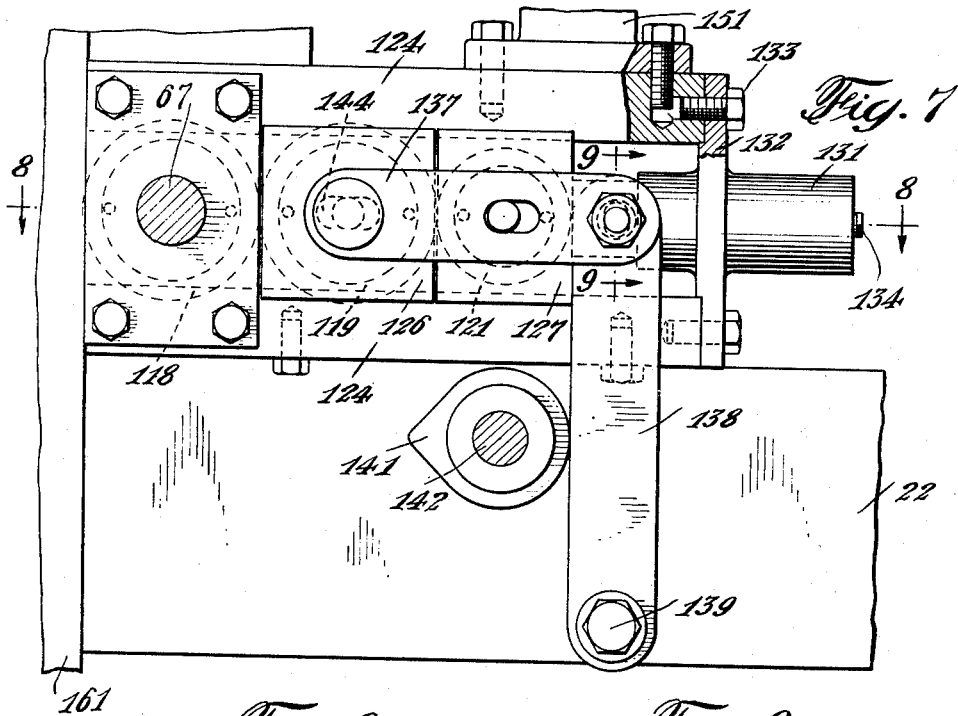
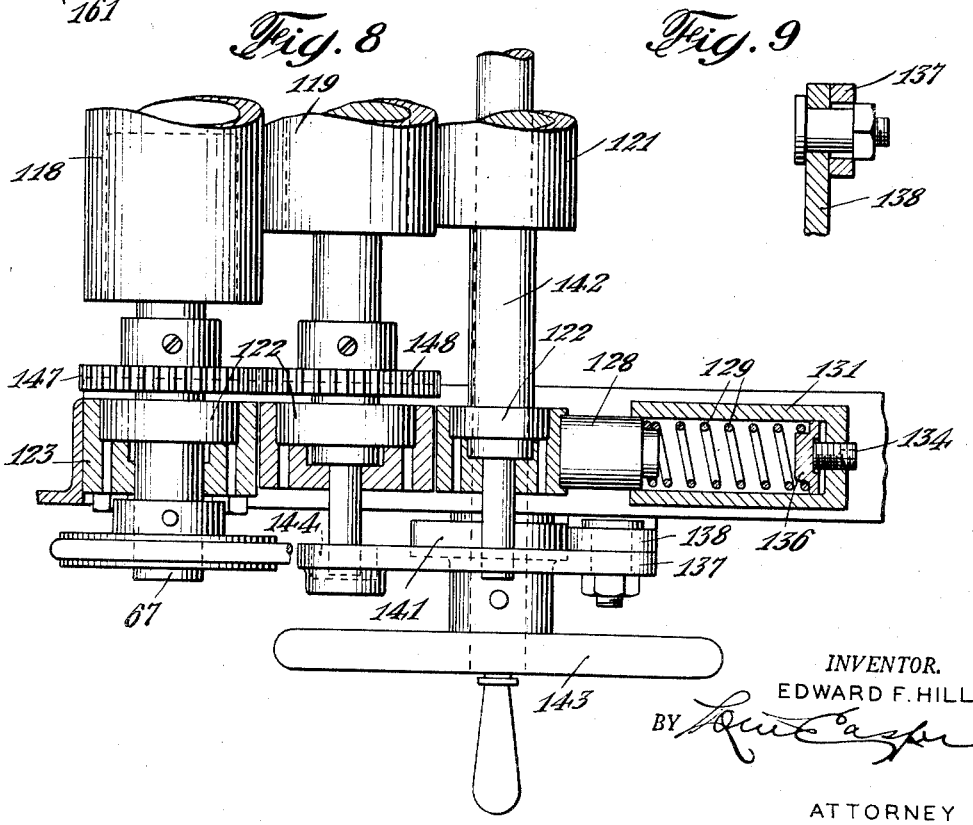
INVENTOR.
EDWARD F. HILL
BY
ATTORNEY May 13, 1952 E. F. HILL 2,596,400
SEALED EDGE SLITTING MACHINE
Filed April 2, 1949 12 Sheets-Sheet 8
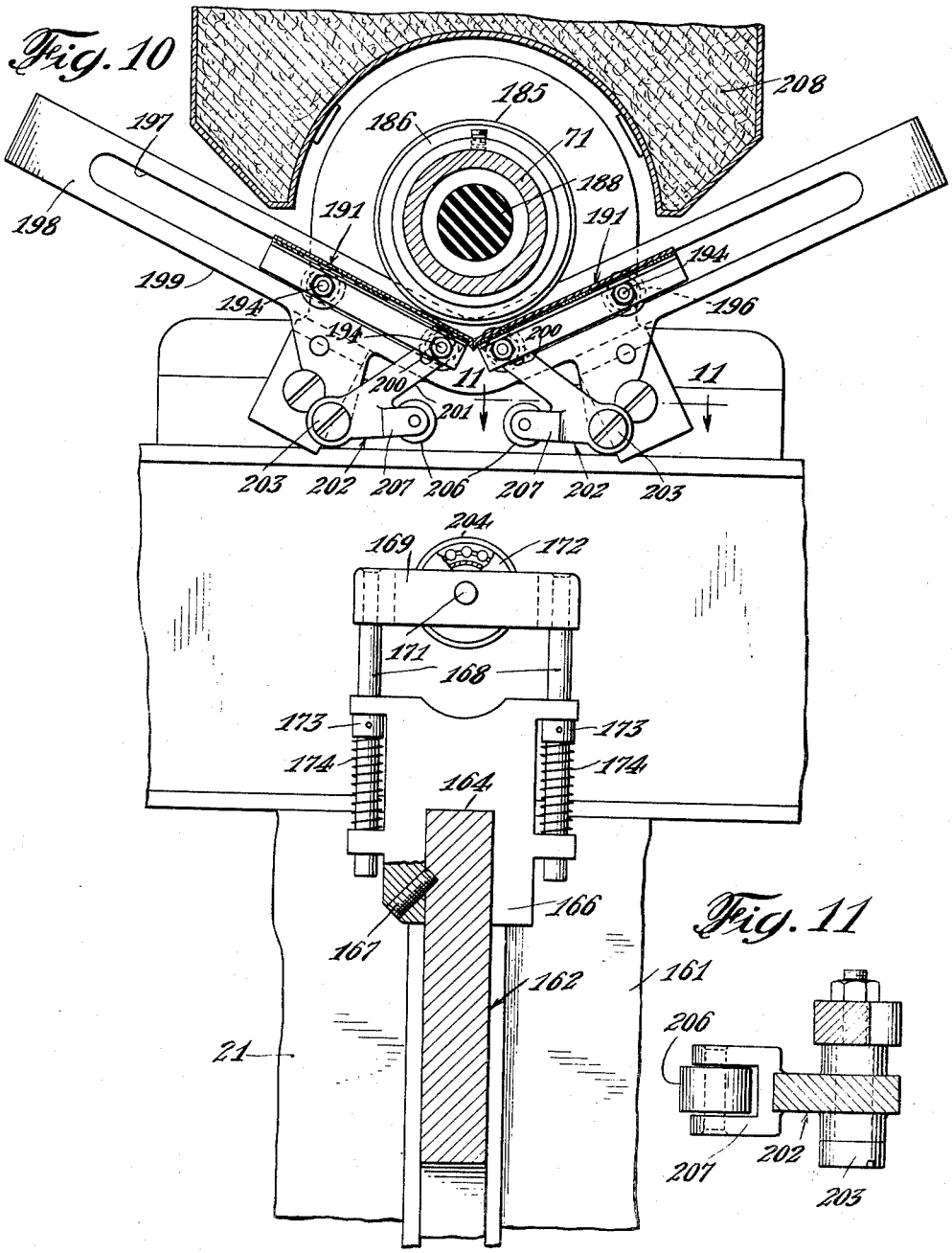
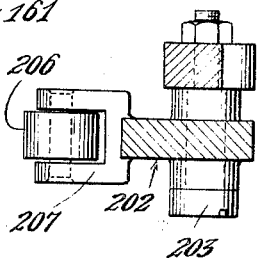
INVENTOR.
EDWARD F. HILL
BY
ATTORNEY May 13, 1952 E. F. HILL 2,596,400
SEALED EDGE SLITTING MACHINE
Filed April 2, 1949 12 Sheets-Sheet 9
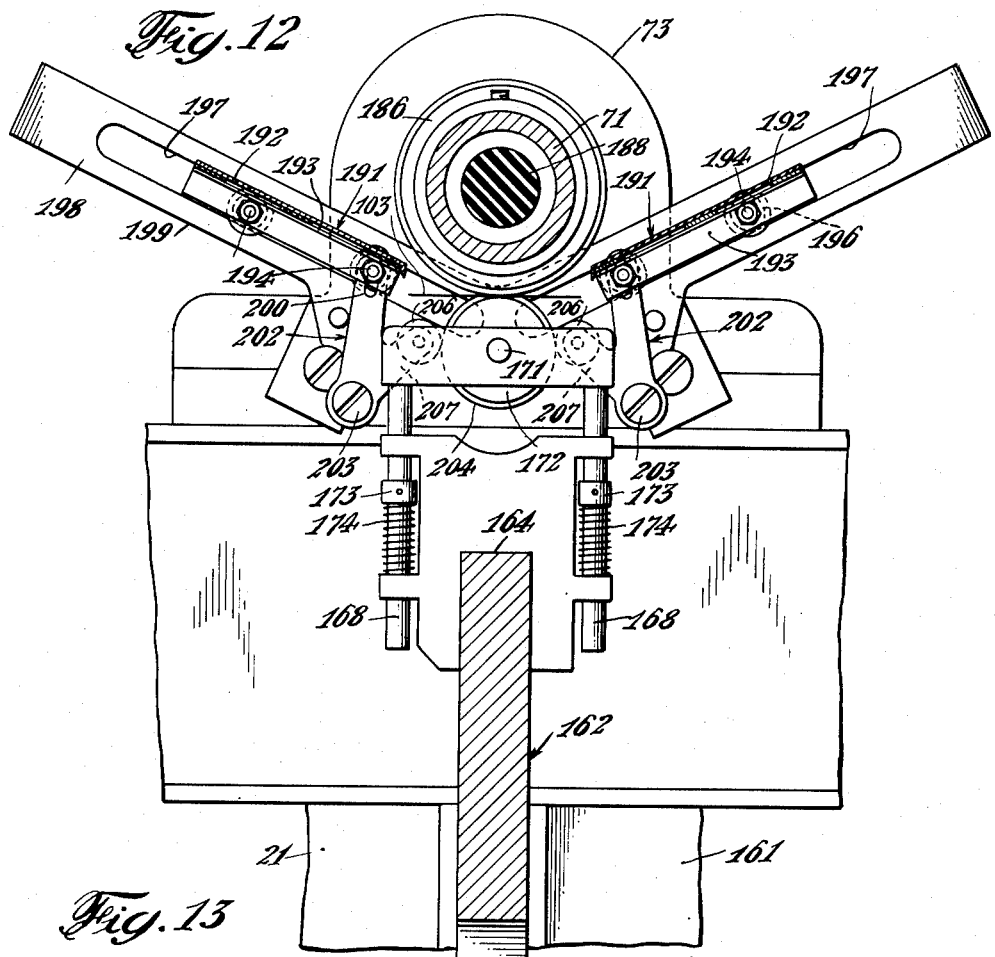
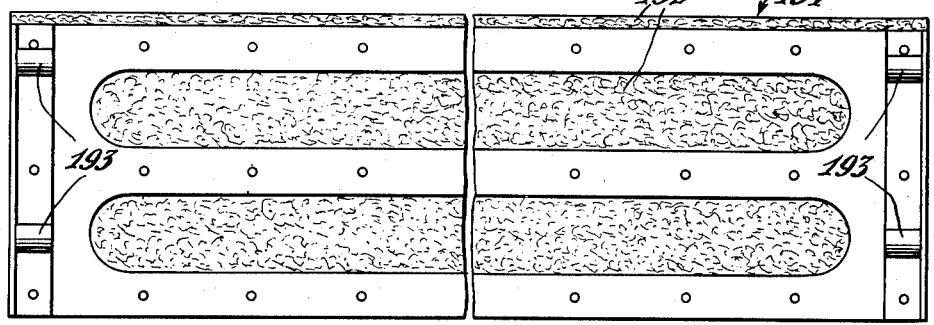
INVENTOR.
EDWARD F. HILL
BY
ATTORNEY

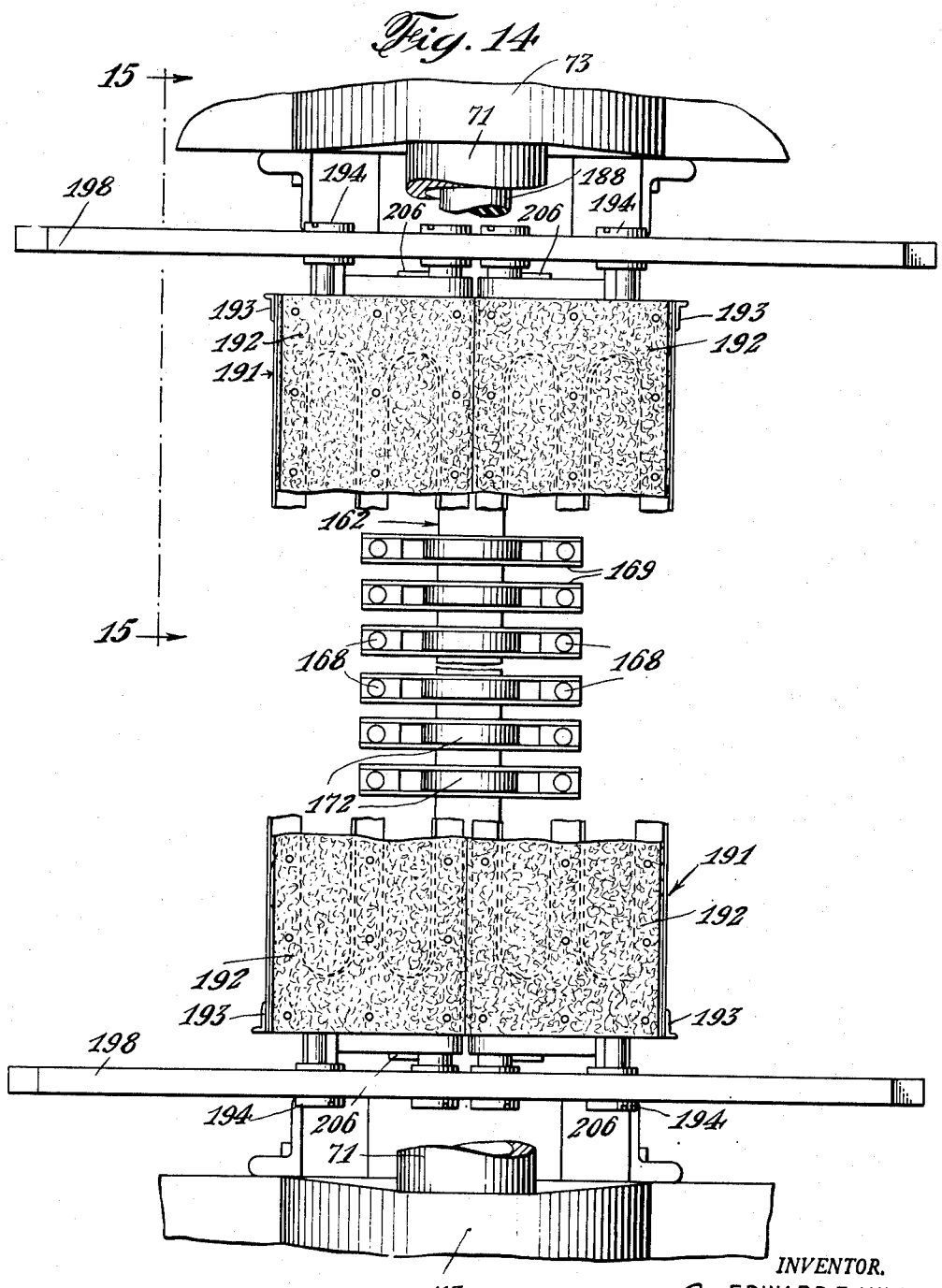

May 13, 1952 E. F. HILL 2,596,400
SEALED EDGE SLITTING MACHINE
Filed April 2, 1949 12 Sheets-Sheet 11
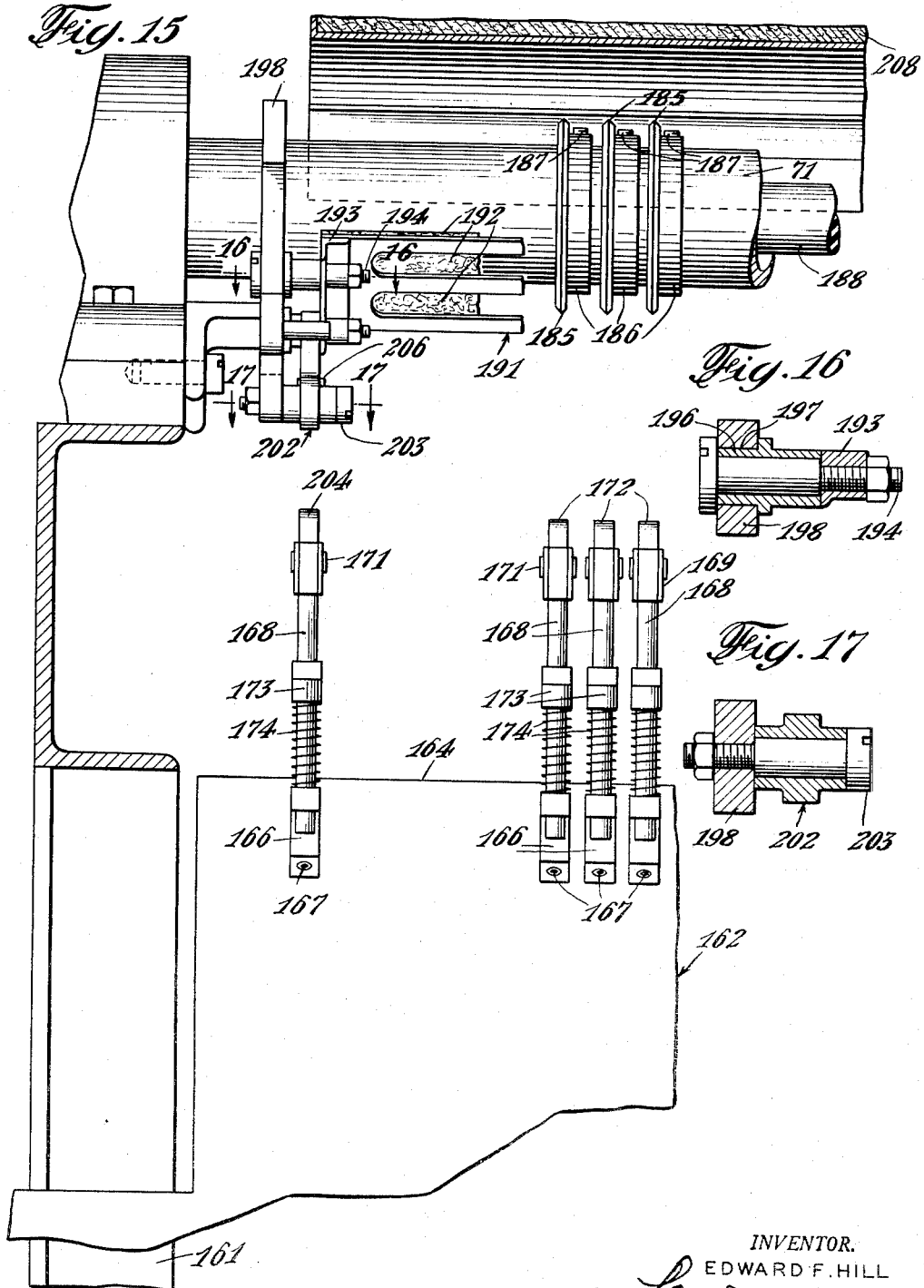
INVENTOR.
EDWARD F. HILL
BY 
ATTORNEY May 13, 1952 E. F. HILL 2,596,400
SEALED EDGE SLITTING MACHINE
Filed April 2, 1949 12 Sheets-Sheet 12
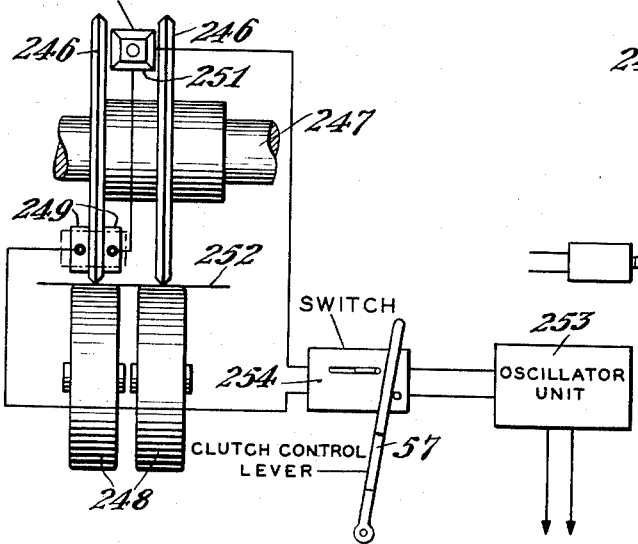
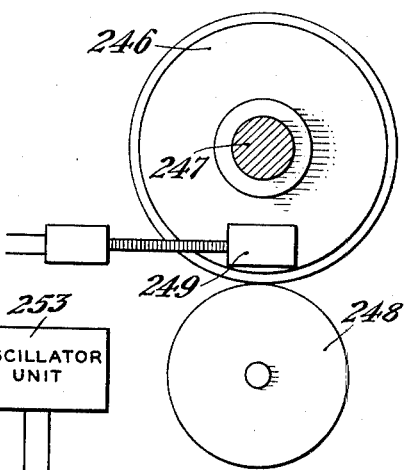
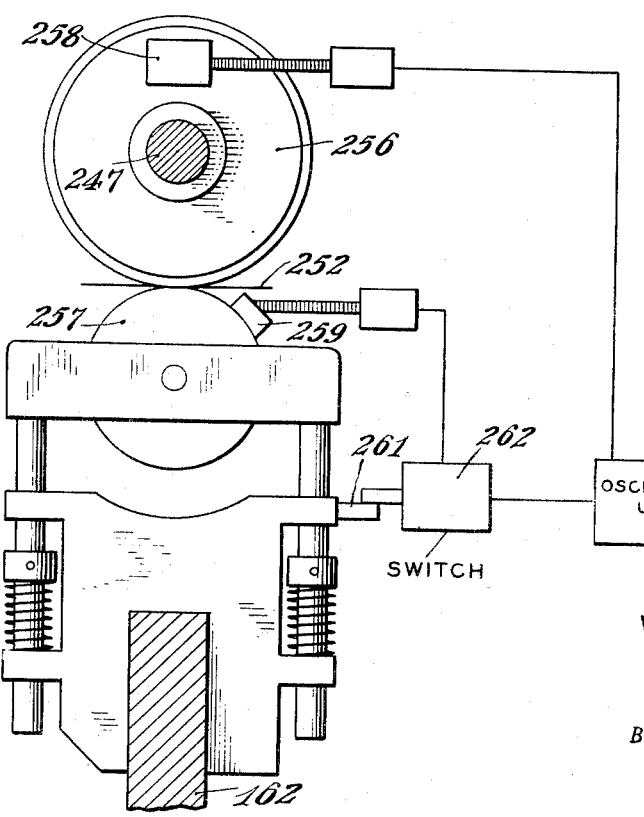
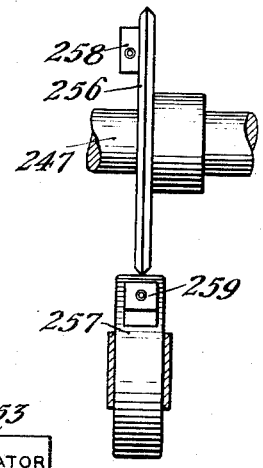
INVENTOR.
EDWARD F. HILL
BY
ATTORNEY Patented May 13, 1952

2,596,400

UNITED STATES PATENT OFFICE 2,596,400

SEALED EDGE SLITTING MACHINE

Edward Fiske Hill, Ridgewood, N. J.

Application April 2, 1949, Serial No. 85,215

9 Claims. (Cl. 164—65)

This invention relates generally to ribbon cutting machines and more particularly to a machine for cutting, forming and/or severing a continuous web of substantial width, composed at least in part of a heat liquifiable material such as organic or thermoplastic derivatives of cellulose, into a plurality of relatively narrow continuous strips or ribbons.

In the art of forming ribbons of relatively narrow width, as for example, in the neighborhood of one-half inch more or less, it has been the practice to weave or otherwise produce a continuous web of substantial width and include therein or produce the same entirely of yarn and/or fibers of organic or thermoplastic derivatives of cellulose, and subsequently sever the web into strips by heated severing elements. For example, these elements may be heated stationary knives or heated rotatable cutting discs. The heated severing element cuts and/or melts or partially melts the ends of the fibers in the fabric web of the derivatives of cellulose and/or those fibers of such material lying parallel or near the cut edge, and when the edge of the severed strip subsequently cools, the melted or partially melted cellulose fibers fuse or weld together with the unmelted fibers to form a sealed edge.

It is the latter or circular disc type cutting element machine to which the features of the present invention are particularly adaptable. However, it will be obvious that various features thereof are applicable to ribbon cutting machines employing other types of severing elements.

In general, the machine described herein is supplied with a roll of the fabric to be severed and the fabric is unwound and moved past the severing elements where it is severed or cut into longitudinal strips, and then the strips of ribbon rolled up on a take-up roll. In machines of this type it sometimes happens that the fabric is not evenly rolled up on the supply roll and as the fabric unrolls therefrom it may have a tendency to creep or move at a slow rate toward one side of the machine or the other. Such movement of the fabric with respect to the severing elements may result in one or more of the end ones of the severing elements no longer being in operative relation with the fabric and the consequent production of one or more of the end ribbons containing a web selvage edge and on the opposite side a ribbon of variable width containing an excessive and wasteful amount of the original web.

In view of the above it is one of the objects and features of the present invention to provide a ribbon cutting machine of the above general type wherein provision is made for moving the supply roll of fabric lengthwise of the axis thereof to counteract or eliminate any tendency of the fabric to creep from one side of the machine to the other at the severing elements.

Another feature of the invention resides in the provision of means for taking up the selvage edges of the severed fabric independently of the take-up reel or rolls of the severed web or ribbons.

With machines of the above type it has been found that in order to sever the fabric at a reasonable rate of speed it is necessary to maintain the cutting elements at temperatures above the scorching temperature of the fabric. With the cutting elements maintained at this temperature the stopping of the longitudinal movement of the fabric for one reason or another is quite likely to result in the scorching of the fabric near the severing elements and the resultant ruining or damping of the ribbons thereat. In this connection a feature of the invention resides in the provision of means for shielding the fabric from the heated severing means when desired, and thus enable the movement of the fabric to be stopped at any time without scorching the same.

Another feature of the invention resides in the arrangement for heating the severing elements and/or the fabric as it is severed by high frequency electronic heating.

The above and further objects and features of the invention will be more apparent from the following detailed description thereof wherein reference is made to the accompanying drawings, in the latter of which:

Fig. 4 is a rear end elevational view of the machine;

Fig. 4A is a perspective view of one end of the movable plate upon which the pressure roller brackets are mounted.

Fig. 5 is a longitudinal vertical sectional view of the machine taken substantially on line 5—5 of Fig. 1;

Fig. 6 is a horizontal sectional view taken substantially on line 6—6 of Fig. 2, and illustrates some of the details of the driving mechanisms of the machine;

Fig. 7 is a fragmentary detail view of the fabric feeding mechanism;

Fig. 8 is a horizontal sectional view taken substantially on line 8—8 of Fig. 7;

Fig. 9 is a detail sectional view taken substantially on line 9—9 of Fig. 7;

Fig. 10 is a fragmentary vertical sectional view taken on line 10—10 of Fig. 1, and illustrates the arrangement and operating means for the heat shielding elements for the circular cutting discs;

Fig. 11 is a detail sectional view taken substantially on line 11—11 of Fig. 10;

Fig. 12 is a fragmentary vertical sectional view of the elements of Fig. 10 showing the heat shielding elements in a non-shielding position.

Fig. 13 is a detail underside view of one of the heat shielding units;

Fig. 14 is a plan view of some of the heat shields and their operating elements;

Fig. 15 is a vertical sectional view taken substantially on line 15—15 of Fig. 14, illustrating some of the heat shield operating elements;

Figure 1:
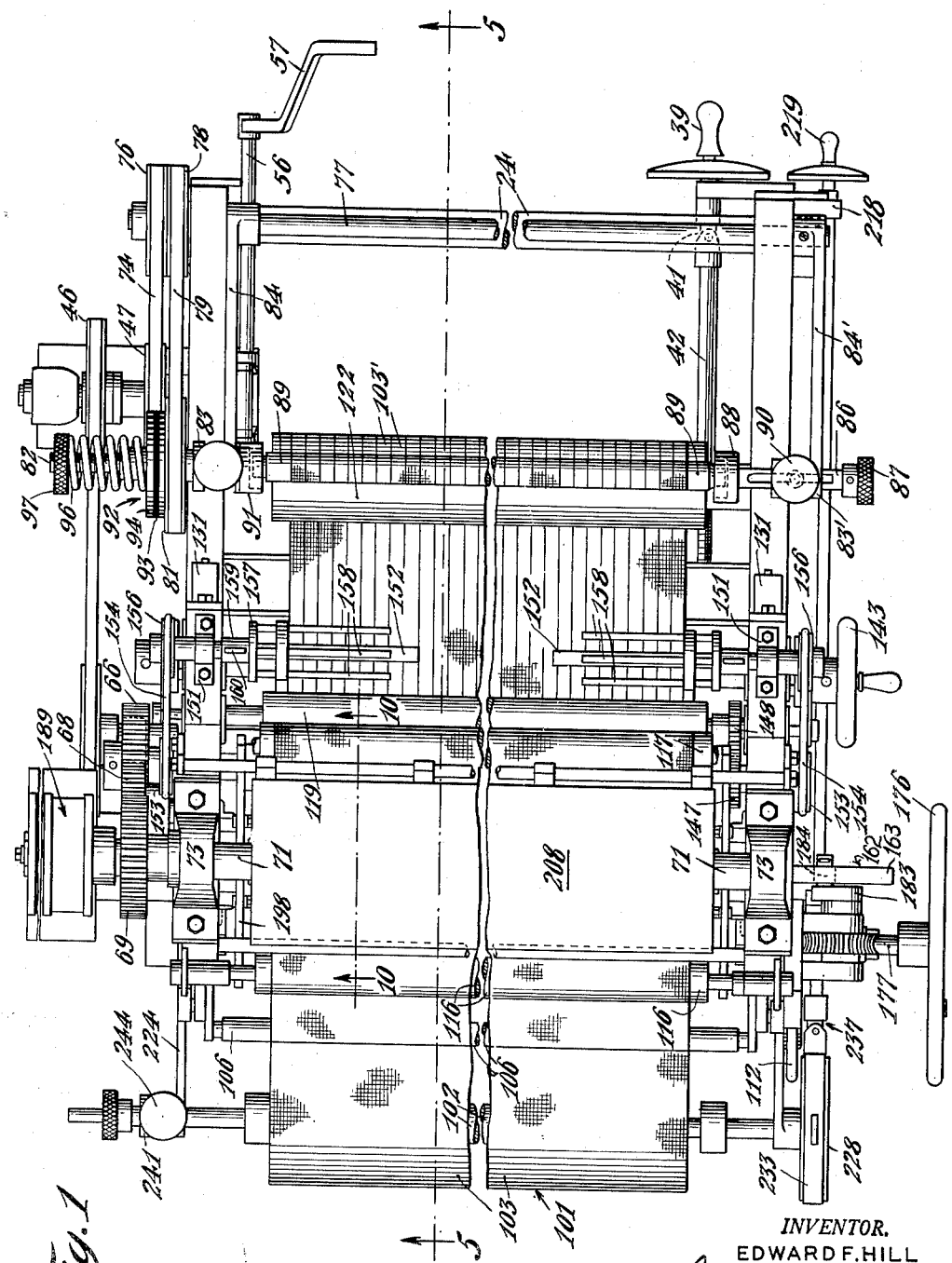
Fig. 1 is a plan view of the machine embodying the invention with the front of the machine to the right, and illustrates the manner in which the machine operates to sever a roll of fabric into a plurality of ribbons.

Figs. 16 and 17 are sectional views taken on lines 16—16 and 17—17, respectively, of Fig. 15;

Figs. 18 and 19 are diagrammatic representations of a modified cutter disc heating arrangement wherein high frequency electronic heating means is employed; and Figs. 20 and 21 are diagrammatic representations of a second modification of the high frequency electronic heating means.

Referring to Figs. 1 to 6, inclusive, the structural framework of the machine will first be described. This framework includes four vertical posts 21 adjacent the four corners of the machine and they may be of any suitable construction such as channel members. Extending between the posts on each side of the machine is an upper channel member 22 and a lower channel member 23, and the two sides of the machine are connected together by transversely extending members including tie rods or circular members 24 and channel members 25. The tie rods 24 are bolted to the posts 21 by machine screws such as 26, and the above described elements comprise the main structural elements of the machine frame from which the various operating elements thereof are supported. With the exception of the machine screws 26, the various structural elements of each side of the frame are suitably secured together as by riveting or welding to form a rigid framework, and it will be obvious that the various structural members of the machine could be made from castings instead of being built up from individual structural members.

The power for running the machine in the preferred embodiment thereof is furnished from an electric motor M suitably mounted on a plate 27 supported from one of the lower tie rods 24 and one of the lower channel members 23. The pulley 28 on the motor shaft is connected through a belt 29 to the driven pulley or element 31 of a variable speed driving mechanism indicated generally by reference numeral 32. The driving pulley 33 of the variable speed unit, through a belt 34, drives a pulley 36 on a jack shaft 37 suitably journalled in bearings 38 supported from the lower transverse channel members 23.

The motor M is preferably a constant speed motor and through the variable speed drive 32 the operating speed of the machine may be varied to function properly under different conditions. The variable speed drive 32 may be of any suitable type well known in the art, and its speed varying characteristic is controlled by a hand wheel 39. The hand wheel is coupled through a universal joint 41 to a rod 42 which has threaded on the inner end thereof a member 40. By rotating the hand wheel 39 the diameters of the driven and driving pulleys 32 and 33, respectively, of the variable speed drive are changed to produce different speeds of rotation of the jack shaft 37.

The jack shaft 37 has freely mounted on the right hand end thereof a sleeve 43 which has fixed thereto for rotation therewith a pair of pulleys 46 and 47. The inner end of the sleeve 43 also has suitably secured thereto a driven element 48 of a clutch referred to generally by reference numeral 49. The driving element of the clutch includes a toothed member 51 which is keyed to the jack shaft 37 for rotation therewith but is axially movable therealong to bring its teeth into and out of operative relation with those on the driven element 48. The driving element 51 has a circular groove 52 therein which is engaged by pins 53 on the upper ends of a bifurcated member 54. The latter member is secured to a shaft 56 journalled in the framework and which has on its outer end a clutch operating hand lever 57. By throwing the hand lever 57 to one position, the driving member 51 of the clutch 49 is moved into engagement with the driven members 48 thereof whereby the sleeve with its attached elements is rotatable with the jack shaft 37. When it is desired to stop operation of the machine, the hand lever 57 is thrown in the opposite direction to disengage the clutch members 48 and 51.

Figure 3:
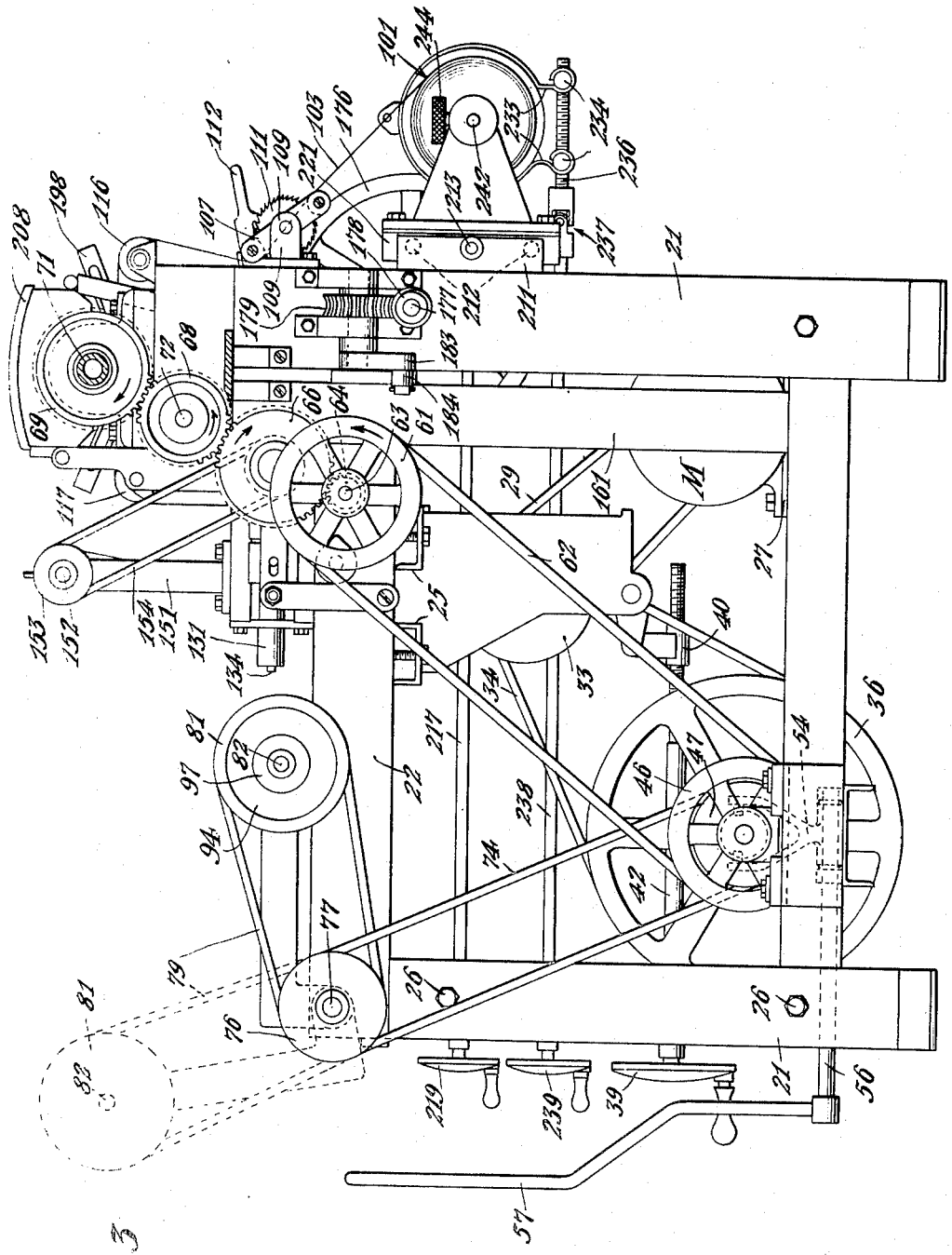
Fig. 3 is a right hand side elevational view of the machine of Fig. 1.

The pulley 46 on the sleeve 43 drives the hereinafter described ribbon severing discs and also furnishes the motive power for advancing the fabric through the machine. As best shown in Fig. 3, the pulley 46, through a belt 62, drives another pulley 61 mounted on a short shaft 63 suitably journalled in the upper channel member 22 on the right hand side of the machine. A gear 64 on the shaft 63 meshes with and drives another somewhat larger gear 66. The gear 66 is fixed to a shaft 67 which is suitably journalled in the framework and extends from one side of the machine to the other. The shaft 67 is included in the hereinafter described fabric advancing mechanism. The gear 66 also meshes with an idler gear 68 which in turn meshes with a gear 69 on a hollow shaft 71 also extending transversely from one side of the machine to the other. The idler gear 68 is mounted on a short shaft 72 which is supported on the right hand side of the machine and the shaft 71 is journalled in bearings 73, Fig. 1, on the upper framework.

The pulley 47, Figs. 1 and 3, through a belt 74, drives a pulley 76 loosely mounted on the left hand end of a shaft 77 in the upper front section of the framework of the machine. Rotatable with the pulley 76 is another pulley 78 which has a belt 79 thereon also engaging a pulley 81. The pulley 81 is freely mounted on a short shaft 82 and the latter is carried in the free end or hub section 83 of an arm 84 which in turn is secured to the transverse shaft 77. A corresponding arm 84' on the opposite side of the machine is secured to and pivots with the shaft 77 and carries in the hub section 83' at the free end thereof a short shaft 86. The shaft 86 has on its outer end a hand knob 87 and is adapted for longitudinal movement in the free end 83' of the arm 84' to permit the hollowed inner end 88 to receive and pivotally support one end of the take-up shaft 89. A clamping member 90 holds the shaft 86 in its adjusted position.

The other end of the take-up shaft 89 is mounted in the hollowed inner end 91 of the shaft 82 and is coupled thereto for rotation therewith by suitable means such as radially extending tongues and grooves in the two elements. The shaft 82 is driven from the pulley 81 through a friction drive indicated generally by reference numeral 92 which includes a friction disc 93 located between one face of the pulley 81 and a friction plate 94. The friction plate 94 is movable axially along the shaft 82 but is coupled thereto by suitable means such as keys and keyways for rotation therewith. A coiled spring 96 presses the plate 94 against the friction disc 93 and the pressure thereof is adjustable by threading the collar 97 along the shaft 82. Thus the take-up shaft 89 is frictionally driven from the motor M since it must rotate at a slower speed as the diameter of the ribbons wound thereon increases for a given speed of severing the fabric.

The fabric web 103 to be severed is supplied from a roll 101 wound on a shaft 102 which is supported in a manner hereinafter set forth on the rear end of the machine. As shown in Fig. 5, the web 103 as it unwinds from the roll 101 is threaded through a tension and smoothening unit indicated generally by reference numeral 104 which includes a pair of transversely extending rods 106. The rods 106 are supported on their extremities in the ends of arms 107 which in turn are pivoted adjacent their centers on pivots 108 in brackets 109 secured to the outer face of the rear posts 21. The arm 107 on the left hand side of the machine has secured thereto for pivoting movement therewith a toothed ratchet wheel 111, Fig. 2, and in operative relation with the wheel 111 is a latch member 112 pivotally mounted on a screw 113. A spring 114 in operative relation with the member 112 urges it into engagement with the toothed ratchet wheel 111.

The web 103, Fig. 5, passes around one side of the lower rod 106 and the opposite side of the upper rod and then over an idler roller 116 suitably supported from the machine frame. By turning the arms 107, as for example, in a counterclockwise direction as shown in Fig. 3, the drag on the fabric web may be increased and there will be a greater tension in the fabric as it passes to the severing units hereinafter described. The latch 112 co-operating with the ratchet wheel 111 latches the arms in the position to which they may be rotated.

Referring to Fig. 5, there is supported in the upper part of the machine a roller 117 similar to and substantially on the same level as the previously mentioned roller 116. The fabric web 103 passes substantially in a horizontal plane from the roller 116 to the roller 117 and then in a downward direction to the web feeding rollers including a roller 118 on the previously mentioned shaft 67. Between the rollers 116 and 117 is the web severing unit, and normally when the fabric reaches the roller 117 it will be in a severed condition, the severed fabric or ribbons being indicated by reference numeral 103'. To the right of the roller 118, as shown in Fig. 5, is located a second roller 119 which in turn has on its right a third roller 121. The roller 118, on the shaft 67, is fixedly positioned on the machine, and the rollers 119 and 121 are urged toward the left by means hereinafter described. The severed fabric or ribbons 103' passes down approximately halfway around the roller 118, up between the rollers 118 and 119, approximately halfway around the upper side of the roller 119, down between the rollers 119 and 121 and thence down around an idler roller 122 to the take-up shaft 89.

The journalling arrangement of the three feed rollers 118, 119 and 121, which may be hollow with short shafts extending from the ends, is best shown in the enlarged detail views, Figs. 7 and 8, of one end, and include ball bearing rings such as 122. As pointed out, the roller 118 is supported in fixedly positioned journals which are secured in blocks such as 123 supported on a pair of short horizontal rails 124. The bearings 122 for the rollers 119 and 121 are mounted in blocks 126 and 127, respectively, which have on the upper and lower surfaces thereof longitudinally extending grooves adapted to engage and be guided on the rails 124. To the right hand side of the block carrying the ball bearing for the roller 121 is a plunger 128 which is urged toward the left by a compression spring 129. The compression spring 129 is contained within a cylinder 131 which has extending arms 132 through which screws 133 pass to clamp the cylinder to the end of the rails 124. In the right hand end of the cylinder 131 is an adjusting screw 134 which enables the position of a disc 136 in the cylinder to be changed and thereby vary the tension or force of the spring 129. Thus the various rollers 118, 119 and 121 are urged together to hold the severed fabric or ribbons 103' in contact with the peripheries thereof and advance the same as the rollers are rotated.

To facilitate the initial threading of the severed fabric or ribbons 103' through the feed rollers, they are separated or moved horizontally with respect to one another to permit ready passage of the fabric therebetween. To this end the outer ends of the shafts of the rollers 119 and 121 pass through slots in links such as 137 which are pivotally attached to their right hand ends, Fig. 7, to the upper end of levers 138. Levers 138 are pivotally mounted on shoulder screws 139 in the horizontal rails 22 and have in operative relation adjacent the centers thereof cams 141. The cams 141 are mounted on a transverse shaft 142 which has secured to the outer end thereof a hand wheel 143. As the hand wheel is rotated, the cams 141 rock the levers 138 and move the links 137 to the right, Fig. 7, and in so doing move the rollers 119 and 121 in the same direction. The openings in the links 137 into which the ends of the shafts of the rollers 119 and 121 extend are so arranged that the right hand roller 121 moves an appreciable amount before the clearance in the slot 144 is taken up by the end of the shaft of the roller 119. Thus the roller 121 is separated from the roller 119 and then the roller 119 is separated from the roller 118. Accordingly there is clearance between each of the rollers 118, 119 and 121 of the web feeding unit and after the threading of the fabric therethrough the hand wheel 143 may be rotated to move the lobe of the cams 141 out of operative relation with the levers 138 whereupon the springs 129 are effective to urge the rollers into engagement with one another.

The feed roller 118 is driven from the motor M through the described drive arrangement and has rotatable therewith a gear 147 which meshes with and drives a gear 148 rotatable with the intermediate feed roller 119. The gears 147 and 148 are such that the peripheral speeds of the feed rollers 118 and 119 are all equal.

Figure 2:
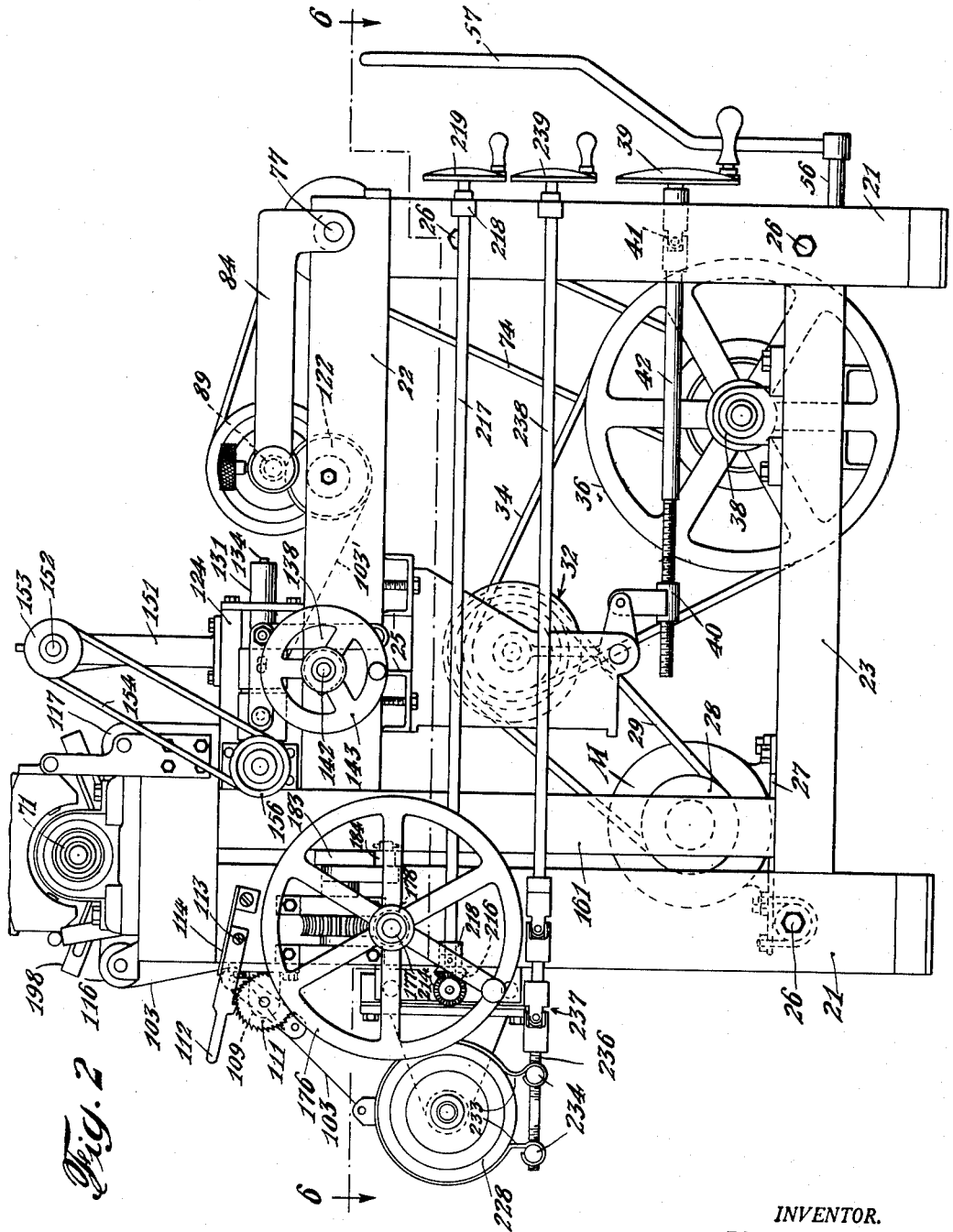
Fig. 2 is a left side elevational view of the machine of Fig. 1, and shows some of the controlling elements and driving mechanisms of the machine.

The webs 103 from which the ribbons 103' are cut in a machine of this type normally have selvage edges which may be of different thickness than that of the web itself, and a ribbon containing the selvage would not under these conditions wind up properly on the take-up shaft 89. Accordingly, it is one of the features of the invention to wind the strips cut from the two edges of the web or fabric up independently of the ribbons formed from the center portions of the web. In this connection a separate selvage take-up unit is provided on each side of the machine for winding up the selvage edges of the web as they are severed therefrom. As shown in Figs. 1, 2 and 3, a pair of brackets 151, one on each side of the machine, is mounted on the upper side of the rails 124 and each has pivotally mounted in the upper ends thereof a shaft 152. Each shaft 152 has a pulley 156 thereon frictionally driven through a belt 154 from a pulley 153 on the shaft 67. The shafts 152 of each selvage take-up unit extends toward the center of the machine, and each has thereon a disc 157. Extending inwardly from the face of the discs 157 and parallel with the shaft 152 but spaced therefrom are a plurality of fingers 158 which form separate reels for the selvage edge strips. As pointed out, the reels of the selvage take-up units are frictionally driven and the fingers 158 facilitate the starting of the winding of the selvage edge strips thereon. The discs 157 have collars 159 through which thumb screws 160 extend whereby the reels are rotated with and adjustable along the shaft 152 and may readily be removed from the machine to permit removal of the rolled up selvage edge strips therefrom.

Spaced from the inner sides of the rear posts 21 are channel members 161, Figs. 3 and 5, and in the space formed between these members is a horizontal plate indicated generally by reference numeral 162. The plate 162, as shown in Figs. 4 and 4A, is substantially U-shaped and has between the channel members 161 and posts 21 horizontal projections 163. The plate 162 is of substantial thickness to provide the required rigidity, and on the upper edge of the central section 164 thereof are mounted brackets 166, Figs. 10 and 15. The brackets 166 are adjustable along the section 164 and are clamped in position by set screws such as 167. The section 164 of the bracket extends substantially the full width between the two sides of the machine and the location of the brackets 166 therealong determines the number and width of the individual strips or ribbons formed from the web 103. As best shown in Figs. 10 and 14, each bracket 166 has slidably mounted therein a pair of upwardly extending rods 168 to the upper ends of which are secured a pair of spaced plates 169. Each pair of plates 169 in turn carry pins 171 upon which are mounted roller bearings 172. The outer race of the roller bearings 172 constitutes a pressure roller through which the fabric, in a manner hereinafter pointed out, is pressed into engagement with a heated circular knife and thereby severed. The above-mentioned rods 168 in each bracket 166 have collars 173 thereon against which springs 174 press and thereby tend to elevate the pressure rollers 172.

Fig. 10 shows a pressure roller 172 and the plate 162 in their lower position wherein the pressure rollers are out of engagement with the cutting discs located thereabove. The plate 162 is elevated when it is desired to bring the pressure rollers into engagement with the cutting discs, and this is effected through a mechanism, hereinafter described, by manually rotating a hand wheel 176, Figs. 1, 2, 3 and 4. The hand wheel 176 is fixed to a shaft 177 extending transversely of the machine which has secured thereto worms, such as 178, engaging worm wheels 179 fixed to shafts 181 horizontally journalled in brackets 182. Also secured to the shaft 181 for rotation therewith are arms 183, Figs. 3 and 4, which carry in the free ends thereof rollers 184 which co-operate with the underside of the projections 163 of the plate 162. As the hand wheel is rotated, the worms 178 rotate the worm wheels 179 to elevate rollers 184 and the plate therewith. With this arrangement the pressure rollers 172 may be urged against their associated cutting discs by variable pressures as governed by the strength of the springs 174 and this pressure may be readily varied at will during operation of the machine by the mere turning of the hand wheel 176.

The above-mentioned hollow shaft 71, which is journalled and rotated in a manner hereinbefore described, is located above the pressure rollers 172 and, as shown in Fig. 15, has spaced therealong a plurality of knife-edged circular cutting discs 185 having flanges 186. The discs 185 are in vertical alignment with respective pressure rollers 172 and are secured to the shaft by set screws such as 187. The spacing of the discs 185 along the shaft 71 determines the width of the ribbons 103' cut from the web 103 and they may be spaced as close as the flanges 186 permit.

In one embodiment of the invention the heat for heating the cutting discs 186 is supplied from electrical resistance units indicated by reference numeral 188, located within the shaft 71. The electrical circuit to the resistance units 188 is completed through a commutator indicated generally by reference numeral 189, Figs. 1 and 3, and it may also include a unit for indicating the temperature of the shaft 71 and, if desired, a thermostatic arrangement for controlling the flow of current to the resistance units.

A feature of the invention resides in the provision of means for shielding the fabric to be severed from the heated shaft 71 and cutting discs 186 when the advancement of the fabric may be halted for some reason or other or when threading the fabric through the machine. This feature is highly desirable with machines of this nature in that it permits the advancement of the fabric to be stopped at any time without scorching of the fabric, which would otherwise result since the temperature of the cutting discs for good operation of the machine must be somewhat above the scorching temperature of the fabric.

When the plate 162 is in its lowermost position, or what may be called the loading or threading position of the machine, as shown in Figs. 10 and 15, the fabric which otherwise would be relatively close or in contact with the cutting discs is moved out of operative relation therewith and an insulating shield placed between the fabric and the heated cutting discs. The shields indicated generally by reference numeral 191, Figs. 10, 12, 13, 14 and 15, consist essentially of flat plates of sheet metal turned up at the edges for reinforcing purposes and covered on their upper sides by an insulating material, such as sheets of asbestos 192. Secured to the ends of the shields 191 are angle brackets 193 which have extending from the sides thereof shoulder screws 194. The shoulder screws 194 carry rollers 196 adapted to roll in slots 197 in arms of Y-shaped bracket members 199, one of which is suitably supported from each side of the machine. The lowermost shoulder screw 194 of each shield 191 is operatively engaged by a slot 200 in the upper end of an arm 201 of a bell crank 202 pivotally mounted on a fixed shoulder screw 203. With the shields 191 in a shielding position such as that shown in Fig. 10, the elevation of the plate 162 brings rollers such as 204 on the ends of the plate into operative relation with rollers 206 at the end of arms 207 of the bell crank 202. Further upward movement of the rollers 204 causes the bell crank 202 to pivot to some position such as that shown in Fig. 12, and in so doing the shields 191 move outwardly and away from the cutting discs 185. The rollers 204 may be mounted on the plate in the same manner as the pressure rollers 172 of the cutting discs 185 but preferably are slightly larger so as to spread the shields 191 before the plate 161 is elevated sufficiently to bring the pressure rollers 172 into engagement with associated cutting discs 185. Normally the rollers 116 and 117 for guiding the fabric 103 to and from the cutting discs 185 are so located that the fabric is bowed or flexed very slightly or not at all when the pressure rollers 172 are moved into their elevated positions. Furthermore, the speed and direction of rotation of the cutting disc 185 are such that the peripheries move in the same direction and at the same speed as that of the fabric. Accordingly, there is no tendency of the fabric to pucker or be otherwise distorted as it moves past the cutting discs.

The higher the temperature of the cutting discs 185, other things being equal, the faster the fabric may be severed, and it is desirable to keep the temperature at a point well above the scorching temperature of the fabric. Since the fabric would otherwise be in contact or close proximity to the heated cutting discs when the movement of the fabric might be stopped, it is necessary to shield the fabric from the cutting discs to prevent scorching thereof when it is not advancing. To this end the lowering of the plate 162 to its lowermost position moves the rollers 204 out of operative relation with the rollers 206 on the bell cranks 202 and thereby permits the shields 191 to slide down the inclined slots 197 thereby shielding the fabric from the heated cutting discs.

In addition to shielding the fabric when movement thereof is stopped, the shields 191 in a position such as that shown in Fig. 10 co-operate with a stationary shield 208 to shield the shaft 71 and cutting discs 186 to limit the heat loss therefrom.

Secured to the upper part of the two rear posts 21 of the machine are a pair of brackets 211, Fig. 6, and mounted in the brackets are a pair of horizontal rods 212, one above the other. Journalled in the brackets 211 between the guide rods 212 is a shaft 213 which has on one end thereof a bevelled gear 214. The bevelled gear 214 meshes with and is driven by a second bevelled gear 216 on the rear end of a shaft 217 journalled in brackets 218 on one side of the machine. On the forward end of the shaft 217 is a hand wheel 219 for rotating the shaft 217, and through the bevelled gears 214 and 216, the shaft 213.

Slidably mounted on the guide rods 212 adjacent the ends thereof are a pair of blocks 221 which have plates 222 secured thereto from which extend arms 223 and 224. The shaft 213 also extends through the blocks 221 and are threadedly engaged thereby. The arrangement of threads on the shaft 213 is such that the blocks 221 with their attached arms 223 and 224 move toward each other when the shaft 213 rotates in one direction and away from each other during rotation of the shaft in the opposite direction.

The left hand arm 223 pivotally supports in the hub section 226 thereof a short shaft 227 which has on the outer end thereof a friction wheel 228 and on the inner end a recessed or hollowed out member 229 adapted to receive one end of a shaft 231 supporting the roller 102 carrying the roll 101 of fabric 103 to be cut. The member 229 in addition to supporting the end of the shaft 231 is arranged to be coupled thereto for rotation therewith by suitable means, such as engaging tongues and grooves, and in addition is capable of moving an appreciable amount axially independently of the shaft 231 while coupled thereto. The purpose of this arrangement will be apparent hereinafter.

The friction wheel 228 on the outer end of the shaft 227 has arranged around the periphery thereof a flexible band or brake shoe 233, the lower ends of which engage members 234, Fig. 3, threaded on the end of a shaft 236. The shaft 236 is coupled by means of universal joints such as 237 to another shaft 238 terminating in the front of the machine and having a hand wheel 239 thereat. By rotating the hand wheel 239 the members 234 move toward or away from each other to vary the pressure of the brake shoe 233 on the friction wheel 228 and thereby vary the amount of tension in the fabric 103 as it unwinds from the roll 101.

The arm 224 on the right hand side of the machine carries a hub 241 which supports a shaft 242. The inner end of the shaft 242 has a hub 243 adapted to receive the other end of the shaft 231 supporting the roll of fabric. For purposes hereinafter apparent, the end of the shaft 231 extends a considerable distance into the hub 243 and therefore the roll of fabric 101 may move transversely of the machine an appreciable amount and still be supported. The shaft 242 is clamped in position in the hub portion of the arm 224 by a clamping member such as the thumb wheel 244 threaded in the hub section.

In operation of the machine, the roll of fabric to be severed is placed in the machine and the hand wheel 219 rotated to move the roll supporting shafts 227 and 242 toward one another and thereby locate the roll of fabric in a central position. Prior to starting the severing operation the hand wheel 219 is then rotated in the opposite direction to separate the members 229 and 243 and thereby the roll of fabric is permitted or conditioned for a limited amount of movement transversely of the machine as the fabric unwinds therefrom. This permits the roll of fabric to more or less assume the position from which the fabric unwinds smoothly and without the creation of wrinkles, puckers or abnormal strains or tensions in one side or the other thereof. In addition, the arrangement through the operation of the hand wheel 219 permits the roll of cloth to be moved transversely of the machine toward its center position from either side during the unwinding of the fabric. Thus the attendant when observing that one of the selvage edges is approaching a minimum or in a position where one of the ribbons will contain a selvage edge can move the roll of fabric to correct this condition.

Figs. 18 and 19, which show in diagrammatic form a modified arrangement of heating the cutting discs, will now be described. In this modification, cutting discs 246 are arranged on a shaft 247 in much the same manner as in the described embodiments, and each has its associated pressure roller 248 to press the fabric 252 against the cutting disc. In Fig. 18 only two cutting discs 246 are shown mounted on the shaft 247 with associated pressure rollers 248. In this embodiment the cutting discs 246 are heated by high frequency electronically induced heat and each has on opposite sides thereof electrodes such as 249. With this arrangement the electrodes 249 heat the cutting disc 246 immediately above the pressure roller 248, and accordingly there is less heat loss from the cutting disc than where the disc is heated from a more remote point. In conjunction with this arrangement a thermostatic control 251 may be employed in conjunction with each cutting disc to maintain the cutting disc at the desired temperature. In order to prevent the fabric 252 from being scorched or overheated when the advancement of the fabric may cease for one reason or another, the high frequency current generated in the oscillator unit 253 may be interrupted by a switch 254 of suitable design in conjunction with the operation of the clutch control lever 57. Thus the stopping of the fabric advancing mechanism automatically opens the circuit to the high frequency electrodes 249.

In the modification of the high frequency heating arrangement shown in Figs. 20 and 21, the cutting disc 256 serves as one electrode and its associated pressure roller 257 as the other. The high frequency current is conveyed to these two rotatable electrodes by suitable contacting units 258 and 259 in conjunction with suitable high frequency conductors such as coaxial cables from the oscillator unit 253. In this arrangement the plate 162 from which the pressure rollers such as 257 are supported may be arranged by means of a pin 261 to operate a switch 262 and open the high frequency circuit when the plate is lowered to bring the pressure rollers out of engagement with the cutting discs 258. With this arrangement the oscillator unit 253 may be tuned to bring the system into resonance regardless of the type of thickness of the fabric 252 being severed and heat the fabric to the desired point, particularly at the severed edges thereof. Thus, the fabric 252 may be severed without the necessity of heating the cutting disc 256 to an appreciable or extreme temperature since the fabric itself is the primarily heated material.

It will be obvious to those skilled in the art that various modifications and rearrangements of the invention other than those described and shown may be made without departing from the spirit or essential attributes thereof, and it is desired therefore that only such limitations be placed thereon as are imposed by the appended claims.

What is claimed is:

1. In a device of the type described for forming a plurality of strips or ribbons from a web or sheet of fabric containing at least in part yarns, threads or filaments of thermoplastic or organic derivatives of cellulose, a plurality of heated rotatable circular knife-edged severing discs, means for moving said fabric in the direction of its length relative to said discs, a plurality of pressure rollers movable toward and away from said discs for pressing said fabric into engagement with said discs, heat shielding means and means for interposing said shielding means between the fabric and said heated severing discs on movement of said pressure rollers away from said discs.

2. In a device of the type described for forming a plurality of strips or ribbons from a web or sheet of fabric containing at least in part yarns, threads or filaments of thermoplastic or organic derivatives of cellulose, a plurality of heated rotatable circular knife-edged cutting discs, means for moving said fabric in the direction of its length relative to said discs, a plurality of pressure rollers movable toward and away from said discs for pressing said fabric into engagement with said discs, heat shielding means, means for interposing said shielding means between the fabric and said heated severing discs on movement of said pressure rollers away from said discs, and means for moving said shielding means from said shielding position on movement of said pressure rollers into engagement with said discs.

3. In a device of the type described for forming a plurality of strips or ribbons from a web or sheet of fabric containing at least in part yarns, threads or filaments of thermoplastic or organic derivatives of cellulose, a plurality of heated rotatable circular knife-edged severing discs, means for moving said fabric in the direction of its length relative to said discs, a plurality of pressure rollers movable toward and away from said discs for pressing said fabric into engagement with said discs, a pair of heat shielding plates, and means operative on movement of said pressure rollers away from said severing discs to concomitantly move said shielding plates together and between said fabric and said heated discs.

4. In a device of the type described for forming a plurality of strips or ribbons from a web or sheet of fabric containing at least in part yarns, threads or filaments of thermoplastic or organic derivatives of cellulose, a plurality of heated rotatable circular knife-edged severing discs, means for moving said fabric in the direction of its length relative to said discs, a plurality of pressure rollers movable toward and away from said discs for pressing said fabric into engagement with said discs, a pair of heat shielding plates normally tending to move into a position to shield said fabric from said severing discs, and means operative on the movement of said pressure rollers away from said discs to permit movement of said plates between said discs and said fabric.

5. In a device of the type described for forming a plurality of strips or ribbons from a web or sheet of fabric containing at least in part yarns, threads or filaments of thermoplastic or organic derivatives of cellulose, a plurality of rotatable circular knife-edged cutting discs, means for moving said fabric in the direction of its length relative to said discs, a plurality of pressure rollers movable toward and away from said discs for pressing said fabric into engagement with said discs, a source of high frequency electronic current, electrical circuits for conducting said current to said discs to heat the same, a switch in said circuits and means operative on the movement of said pressure rollers into engagement with said discs to close said switch to complete said circuits whereby said discs sever said fabric by cutting action and/or melting of the contained thermoplastic material.

6. In a device of the type described for forming a plurality of strips or ribbons from a web or sheet of fabric containing at least in part yarns, threads or filaments of thermoplastic or organic derivatives of cellulose, a plurality of rotatable circular knife-edged cutting discs, means for moving said fabric in the direction of its length relative to said discs, a plurality of pressure rollers movable toward and away from said discs for pressing said fabric into engagement with said discs, a source of high frequency electronic current, a disc and associated pressure roller of each pair forming terminating electrodes for said current, means including said current to heat said fabric, current controlling means for said current, and means operative concomitantly with the movement of said pressure rollers into and out of engagement with said discs to operate said current controlling means to complete and interrupt respectively circuits to said terminating electrodes whereby the fabric is severed by the cutting action of said discs and the melting of the contained thermoplastic material.

7. In a device of the type described for forming a plurality of strips or ribbons from a web or sheet of fabric containing at least in part yarns, threads or filaments of thermoplastic or organic derivatives of cellulose, a plurality of rotatable circular knife-edged severing discs, said cutting discs being heated to a temperature above the scorching temperature of said fabric, means for moving said fabric in the direction of its length substantially tangential to said heated discs, a plurality of resistant pressure elements simultaneously movable toward and away from said discs for pressing said fabric into engagement with said discs, and means automatically operative on the movement of said pressure elements from engagement with said discs to heat shield said fabric from said heated discs.

8. In a device of the type described for forming a plurality of strips or ribbons from a web or sheet of fabric containing at least in part yarns, threads or filaments of thermoplastic or organic derivatives of cellulose, a plurality of rotatable circular knife-edged severing discs, said cutting discs being heated to a temperature above the scorching temperature of said fabric, means for moving said fabric in the direction of its length substantially tangential to said heated discs, a plurality of resistant pressure elements simultaneously movable toward and away from said discs for pressing said fabric into engagement with said discs, and means for heat shielding said fabric from said heated discs when said pressure elements are a predetermined distance away from said discs.

9. In a device of the type described for forming a plurality of strips or ribbons from a web or sheet of fabric containing at least in part yarns, threads or filaments of thermoplastic or organic derivatives of cellulose, a plurality of rotatable circular knife-edged severing discs, said severing discs being heated to a temperature above the scorching temperature of said fabric, means for moving said fabric in the direction of its length substantially tangential to said heated disc, a plurality of resistant pressure elements simultaneously movable toward and away from said discs for pressing said fabric into engagement with said discs, a heat shield interposable between said fabric and said discs for shielding said fabric from said heated discs, and means for automatically moving said shield into and out of a shielding position in conjunction with the movement of said pressure elements out of and into engagement with said fabric and discs.

EDWARD FISKE HILL.

REFERENCES CITED

The following references are of record in the file of this patent:

UNITED STATES PATENTS

| Number | Name | Date |
| --- | --- | --- |
| 223,475 | Brombacher | Jan. 13, 1880 |
| 525,502 | Long | Sept. 4, 1894 |
| 1,798,630 | Robert | Mar. 31, 1931 |
| 1,998,929 | McJohnstone | Apr. 23, 1935 |
| 2,111,054 | Paul | Mar. 15, 1938 |
| 2,251,282 | Huizeng | Aug. 5, 1941 |
| 2,286,675 | Gibbons | June 16, 1942 |
| 2,293,178 | Stocker | Aug. 18, 1942 |
| 2,327,468 | Stocker | Aug. 24, 1943 |
| 2,464,932 | Jones | Mar. 22, 1949 |